Dec. 18, 1962 K. L. AUSTIN 3,069,666
MAGNETIC TAPE STORAGE SYSTEM
Filed Nov. 2, 1956
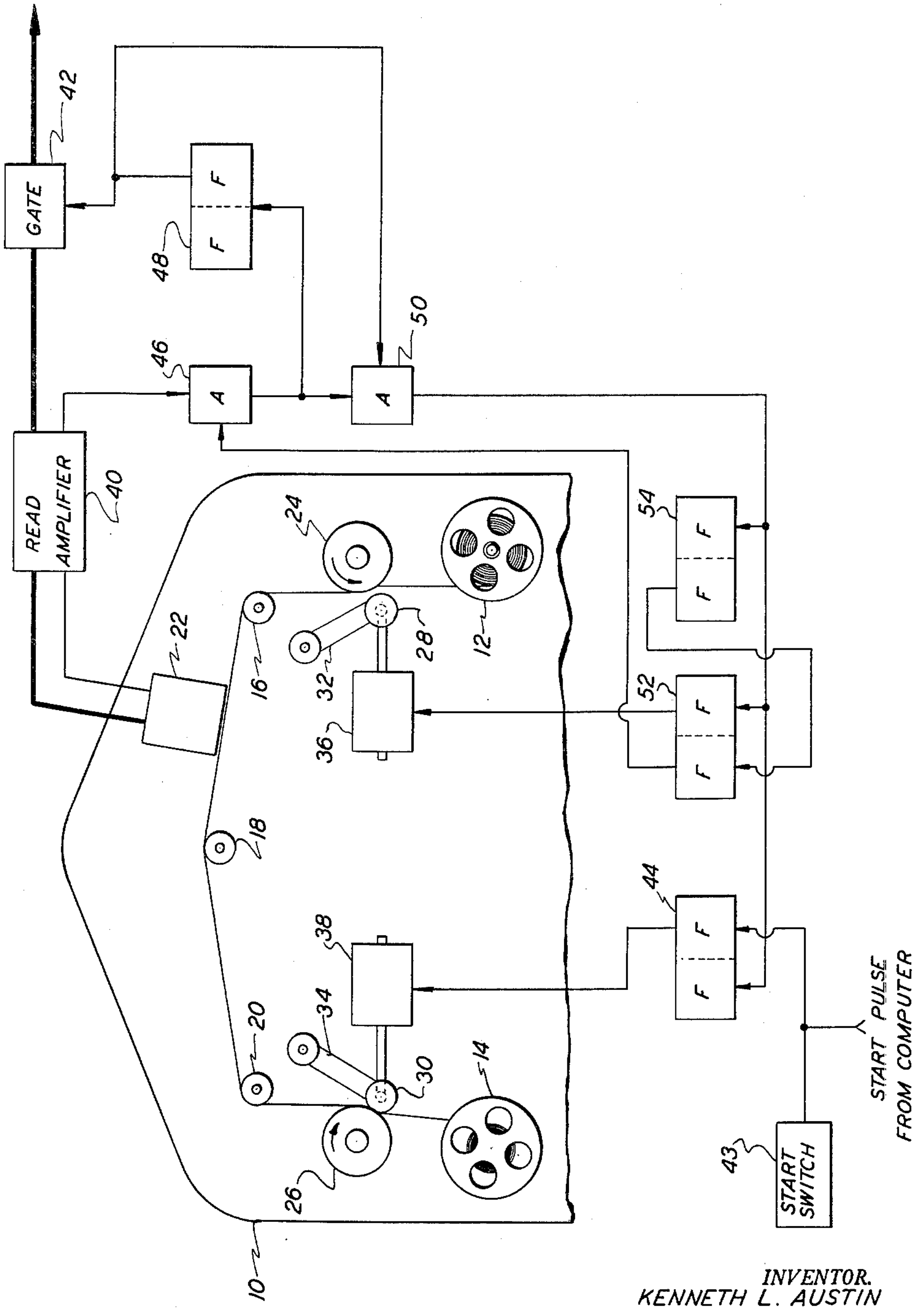
INVENTOR.
KENNETH L. AUSTIN
BY
Christie, Parker & Hale
ATTORNEYS 3,069,666
Patented Dec. 18, 1962

3,069,666

MAGNETIC TAPE STORAGE SYSTEM

Kenneth L. Austin, Grapevine, Tex., assignor to Burroughs Corporation, Detroit, Mich., a corporation of Michigan Filed Nov. 2, 1956, Ser. No. 620,070
6 Claims. (Cl. 340—174.1)

This invention relates to magnetic tape storage systems, and more particularly, is concerned with an improved control circuit for the tape drive.

Tape recorder systems have been used heretofore to provide storage means for digital computers. In general, information is transferred from storage on a magnetic tape into the computer in blocks of information at a time. It has been the practice heretofore to space the blocks of information along the tape in such manner that the tape can be stopped after each block is transferred and then started again to transfer the next block of information out from the tape to the computer. Because of the inertia of the tape transport system, space must be provided along the tape between the blocks of information to permit the tape to decelerate to a stop and then accelerate to full speed again between blocks of information. As a result, as much as half the tape is wasted in blank areas between the blocks of information required to permit the stopping and starting of the tape transport between reading out of blocks of information.

The present invention in its operation eliminates the need for spaces between the blocks of information on the tape to provide for stopping and starting of the tape. As a result, the present invention provides a substantial savings in the total amount of tape required to store a given number of blocks of information, the saving of tape being particularly significant in the saving of time effected during the information search operation in which a particular block of information is being sought.

According to the present invention, means is provided for identifying the end of one block of information and the start of the next block of information on the magnetic tape, such as for example, a magnetic bit stored in a separate channel on the tape. After the tape is started initially in the forward direction, the first magnetic bit read out initiates the reading out of the following information block. The magnetic bit at the end of the information block is utilized to reverse the tape drive mechanism. At the same time the pulse which is produced by the magnetic bit to reverse the drive is delayed by suitable delay means to stop the drive mechanism after it has been driven in the reverse direction for a predetermined length of time sufficient to roll back the tape to a point preceding the next succeeding block of information. Thus, the next time the tape is started in the forward direction to read out the next block of information, the operation repeats itself, the magnetic bit used to reverse and stop the drive at the end of the reading of the prior block of information now being used to initiate the reading out of the next block of information.

For a better understanding of the invention reference should be had to the accompanying drawing wherein the single FIGURE is a schematic block diagram of the tape transport system and associated control circuit.

In the drawing, the numeral 10 indicates generally a frame member which supports the tape transport system. The tape transport system includes a tape storage reel 12 and take-up reel 14, the tape from the reel 12 passing over suitable guide pins 16, 18 and 20 to the reel 14. The reels 12 and 14 are diven in conventional manner by means of reversible reel drive motor (not shown). A multiple channel read out transducer 22 is positioned adjacent the surface of the magnetic tape between the guide pins 16 and 18.

A pair of capstans 24 and 26 driven in opposite directions by suitable drive means (not shown) are utilized to drive the tape in one direction or the other past the transducer 22. The direction of the tape is determined by means of pinch rollers 28 and 30 journaled in suitable pivot support arms 32 and 34 respectively. The pinch rollers 28 and 30 are respectively moved into engagement with the tape so as to press the tape against the respective one of the capstans 24 and 26 by means of solenoids 36 and 38 supported by the main frame 10 and linked to the respective support arms 32 and 34.

The several output channels of the transducer 22 are amplified by suitable read amplifiers 40, the information channels being gated by suitable gating means 42 to a computer or other utilization device.

Forward movement of the tape initiates read out of a block of information and may be provided by a start pulse derived from a start switch 43 or from the associated computer, for example. The start pulse is used to trigger on a bistable multivibrator or flip-flop 44. The flip-flop 44 is of a conventional type which can be set to one stable condition and reset to the initial stable condition by separate inputs. A suitable flip-flop circuit is shown in the book, High Speed Computing Devices, McGraw-Hiill Book Company, Inc., 1950, page 16. This type of flip-flop circuit is represented in the drawing by a block having two inputs on either side of the center of the block. The multivibrator 44, when triggered on, actuates the solenoid 38 so as to commence the forward drive of the tape past the transducer 22. As mentioned above, the dividing point between successive sections or blocks of information stored on the tape are identified in suitable manner, such as by magnetic bit stored in a separate channel on the tape. This magnetic bit marking the division point between successive blocks of information is read out by the transducer 22 through a separate channel in the read amplifier 40 and coupled through an AND gate 46 to the trigger or complementing input of a conventional bistable multivibrator or flip-flop circuit 48. A typical flip-flop circuit having a complementing input is described in the above-mentioned book, High Speed Computing Devices, page 14. In the drawing, this type of flip-flop is shown as a block with a complementing input going to the center of the block. As soon as the first magnetic bit is detected by the transducer 22, indicating the start of the first full block of information on the tape, the flip-flop 48 is triggered on, opening the gate 42 so as to permit read out of the following block of information to the computer.

The flip-flop 48, in addition to gating on the gate 42 also gates open an AND gate 50 which is coupled to the output of the AND gate 46. As a result, the next successive pulse derived from the magnetic bit indicating the next division point between the block of information being read out of the tape and the next successive block of information stored thereon is passed by the AND gate 50.

The pulse marking the end of the block of information is passed by the AND gate 50 to a bistable multivibrator 52. As a result, the multivibrator 52 is triggered on. The multivibrator 52, when triggered on, activates the solenoid 36 so as to initiate the reverse drive of the tape past the transducer 22. At the same time the pulse passed by the AND gate 50 triggers off the multivibrator 44 so as to de-energize the solenoid 38 and interrupt the forward drive of the tape. The pulse passed by the AND gate 46, being coupled to the trigger or complementing input of the flip-flop 48, also returns the flip-flop from its "on" condition to its initial "off" condition, whereby the gate 42 is closed.

The pulse passed by the AND gate 50 is also coupled to a monostable multivibrator 54 which is arranged to produce an output pulse when it returns to its initial stable state. This output pulse is used to trigger off the multivibrator 52. As a result, the reverse drive is interrupted after a predetermined time interval as fixed by the delay time of the multivibrator 54. The delay time of the multivibrator 54 is set to a value such that the tape is backed up to a point with relation to the transducer 22 that is just ahead of the start of the next block of information on the tape.

The multivibrator 52 also controls the gate 46 so that the gate 46 is closed when the reverse drive is actuated. This blocks the pulse produced by the information division indicating magnetic bit during the roll-back of the tape.

When the next block of infomation is called for, the above described process is repeated. The magnetic bit produces an output pulse through the AND circuit 46 triggering on the flip-flop 48 and opening the read out gate 42. The operation at the end of the block of information as read out from the tape then repeats with automatic roll-back of the tape.

From the above description it will be seen that by the present invention no space need be provided between successive sections of blocks of information on the tape. A single magnetic bit may be used for indicating the end of the previous section and the start of the succeeding section of information on the tape. By rolling back the tape a predetermined amount at the end of the read out of a particular block of information, the apparatus is automatically set up to read out the next block of information. As a result, a considerable saving in length of the required to store a given number of blocks of information may be effected. Not only does this result in a saving of tape but also is important in the saving of time required to search or scan through a number of information blocks to pick out a particular block of information as called for by the computer. Much less tape must be scanned in going through a given number of information blocks.

What is claimed is:

1. Transport apparatus for magnetic tape on which groups of information are stored magnetically, the end of one group and start of the next group being identified on the tape by a stored magnetic bit, said apparatus comprising means including a transducer for reading out the information on the tape, means for driving the tape in a forward direction past said reading out means, means for driving the tape in a reverse direction past said reading out means, means for interrupting said forward drive means and actuating said reverse drive means in response to said magnetic bit identifying the end of an information group, means responsive to the reading out of said magnetic bit for interrupting said reverse drive means after a predetermined period, and means for gating on and off the output from the reading out means, said gating means including means responsive to the first magnetic bit following the start of the forward drive means for gating on the output, and means responsive to the second magnetic bit for gating off the output, whereby only the one information group following the first magnetic bit identifying the start of an information group is read out.

2. Transport apparatus for tape on which groups of information are stored, the end of one group and start of the next group being identified on the tape by a stored bit, said apparatus comprising means including a transducer for reading out the information on the tape, means for driving the tape in a forward direction past said reading out means, means for driving the tape in a reverse direction past said reading out means, means for interrupting said forward drive means and actuating said reverse drive means in response to said bit identifying the end of an information group, means responsive to the reading out of said bit at the end of an information group for interrupting said reverse drive means after a predetermined period, and means for gating on and off the output from the reading out means, said gating means including means responsive to the first bit following the start of the forward drive means for gating on the output, and means responsive to the second magnetic bit for gating off the output, whereby only the one information group following the first bit identifying the start of an information group is read out.

3. Apparatus for reading out information stored on a tape in sections identified by a bit stored on the tape at a point between sections of information, said apparatus comprising means including a transducer for reading out information stored on the tape, means for generating pulses in response to said section identifying bits as the tape moves past the transducer, means for driving the tape in a forward direction, means for driving the tape in a reverse direction, means for initially actuating the forward drive means, means responsive to the first pulse generated by said pulse generating means following the start of the forward drive means for gating on the information read out of said reading out means, means responsive to the second pulse from said pulse generating means following the start of the forward drive means for interrupting the forward driving means and activating the reverse driving means, and means for automatically interrupting the reverse drive means after a predetermined delay interval, whereby the tape is positioned to read out the next information section in response to the next operation of said means for initially actuating the forward drive means.

4. Apparatus for reading out information stored on a tape in sections, the tape having indicia at points along the tape where one section ends and the next section starts, said apparatus comprising means including a transducer for reading out information stored on the tape, means for driving the tape in a forward direction, means for driving the tape in a reverse direction, means for initially actuating the forward drive means, means responsive to said indicia at the start of an information section on the tape for gating on the information read out of said reading out means, means responsive to said indicia at the end of the information section for interrupting the forward driving means and activating the reverse driving means, and means for automatically interrupting the reverse drive means after a predetermined delay interval, whereby the tape is positioned to read out the next information section in response to the next operation of said means for initially actuating the forward drive means.

5. Transport apparatus for magnetic tape on which groups of information are stored magnetically, the end of one group and the start of the next group being identified on the tape by magnetic indicia, said apparatus comprising means for driving the tape in a forward direction, means for driving the tape in a reverse direction, means including a transducer for generating a pulse in response to said magnetic indicia indicating the end of one group and the start of the next group as it passes the transducer, means for starting the forward drive means, means responsive to the forward drive starting means for identifying the second pulse from said pulse generating means following the start of the forward drive means, means responsive to said second pulse identifying means for stopping the forward drive means and starting the reverse drive means, and means for automatically stopping the reverse drive means a preselected time interval following the starting of the reverse drive means.

6. Apparatus as defined in claim 5, further comprising means including a transducer for reading out information recorded on the medium, and means for initiating said readout in response to the first pulse and terminating said readout in response to the second pulse from said pulse generating means following the start of the forward drive means.

References Cited in the file of this patent

UNITED STATES PATENTS

| | | |
|---|---|---|
| 2,193,967 | Kleinschmidt | Mar. 19, 1940 |
| 2,574,218 | Lynch | Nov. 6, 1951 |
| 2,782,398 | West et al. | Feb. 19, 1957 |
| 2,792,217 | Weidenhammer et al. | May 14, 1957 |
| 2,819,940 | Sorrells | Jan. 14, 1958 |